United States Patent

Peter-Hoblyn et al.

[11] Patent Number: 5,968,464
[45] Date of Patent: Oct. 19, 1999

[54] UREA PYROLYSIS CHAMBER AND PROCESS FOR REDUCING LEAN-BURN ENGINE $NO_x$ EMISSIONS BY SELECTIVE CATALYTIC REDUCTION

[75] Inventors: Jeremy D. Peter-Hoblyn, Cornwall, United Kingdom; Eric N. Balles, Carlisle, Mass.; Theodore J. Tarabulski, Brewster, N.Y.; John E. Hofmann, Naperville, Ill.; James M. Valentine, Fairfield, Conn.

[73] Assignee: Clean Diesel Technologies, Inc., Stamford, Conn.

[21] Appl. No.: 08/854,831

[22] Filed: May 12, 1997

[51] Int. Cl.$^6$ ................................................. C01B 21/46
[52] U.S. Cl. ........................................ 423/235; 423/239.1
[58] Field of Search ................................. 423/212, 235, 423/239.1

[56] References Cited

U.S. PATENT DOCUMENTS 4,842,834  6/1989  Burton .................................... 423/235

*Primary Examiner*—Thomas Dunn
*Attorney, Agent, or Firm*—St. Onge Steward Johnston & Reens LLC

[57] ABSTRACT

Urea is pyrolyzed in a chamber designed to facilitate gasification of the urea by pyrolysis with conversion of urea to ammonia and isocyanic acid (HNCO) with water vapor and carbon dioxide. The product gases are introduced into exhaust gases from a lean-burn engine, preferably upstream of a turbocharger. The exhaust gases are then contacted with an SCR catalyst.

13 Claims, 3 Drawing Sheets

UREA PYROLYSIS CHAMBER AND PROCESS FOR REDUCING LEAN-BURN ENGINE $NO_x$ EMISSIONS BY SELECTIVE CATALYTIC REDUCTION

TECHNICAL FIELD

The invention relates to means and methods that enable the safe and reliable reduction of nitrogen oxides ($NO_x$) emissions while permitting a diesel or other lean-burn engine to operate efficiently.

Diesel and lean-burn gasoline engines provide advantages in fuel economy, but produce both $NO_x$ and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase $NO_x$.

Current and proposed regulations challenge manufacturers to achieve good fuel economy and reduce particulates and $NO_x$. Lean-burn engines will be necessary to achieve the fuel economy objective, but the high concentrations of oxygen in the exhaust renders typical exhaust gas catalyst systems ineffective for reducing $NO_x$.

SCR (selective catalytic reduction) has been available for years in some contexts for reducing $NO_x$. To date, however, SCR has depended on the use of ammonia, which has safety problems associated with its storage and transport. Urea and other reagents are safer, but have not been practical for many SCR applications—particularly mobile $NO_x$ sources—due to the difficulty in converting them from solid or solution form to active gaseous species, typically $NH_i$ and HNCO radicals.

There is a current need for a safe, economical and effective answer to the problems associated with SCR, particularly for mobile diesel and other lean-burn engines.

BACKGROUND ART

Where SCR catalysts are employed to limit $NO_x$ emissions from diesel engines, one has to deal with either the dangers of ammonia or a risk of fouling the catalysts under most conditions. In this regard, see R. J. Hulterman: A Selective Catalytic Reduction Of $NO_x$ from Diesel Engines Using Injection Of Urea; Ph.D. thesis, September 1995. Hulterman describes a number of technical challenges including clogging of atomizers, decomposition problems and system dynamics.

The limited attempts to use urea SCR for diesel engines have required the use of large pyrolization chambers or other devices following the point of urea introduction into the exhaust, as disclosed in U.S. Pat. No. 5,431,893, to Hug, et al. Equipment of this type highlights the known problems with urea.

Urea takes time to break down in hot exhaust gases and may cause nozzle plugging. To protect an SCR catalyst from fouling, Hug, et al., propose bulky equipment. In addition, this disclosure highlights the necessity of maintaining the urea solution at a temperature below 100° C. to prevent hydrolysis. They propose the use of moderate urea pressures when feeding the urea and find it necessary to have alternative means to introduce high-pressure air into the feed line when it becomes plugged. The nozzles employed by Hug, et al., are apparently capable of producing moderately-fine sprays, the dispersion of which is aided by auxiliary air, but the droplets are still so large that a large pyrolization channel is required. Moreover, they employ dilute solutions that require significant heating to simply evaporate the water. See also, WO 97/01387.

In European Patent Specification 487,886 A1, urea SCR is said to be improved by obtaining quantitative hydrolysis of urea outside the supply lines. The disclosure calls for spraying fine droplets of aqueous urea onto a specially-formulated catalytic surface. The objective of the disclosure is to avoid pyrolysis and its potential for solid deposition, while achieving hydrolysis of urea to ammonia and carbon dioxide.

In European Patent Specification 615,777 A1, there is described an apparatus that feeds solid urea into a channel containing exhaust gases, which are said to be hydrolyzed in the presence of a catalyst. For successful operation the disclosure indicates that it is necessary to employ a hydrolysis catalyst, compressed air for dispersion of fine solids, means for grinding the urea into fine solids and a coating to prevent urea prills form sticking together. The disclosure notes that if the inside of the catalyzer and the nozzle tip only were coated with the catalyst, corrosion and deposition occurred. Despite achieving the goal of removing water from the process, the specification introduces solid urea into the gas stream—possibly depositing urea on the SCR catalyst.

Each of the points of caution by these references about the difficulties of using urea with SCR systems, especially for mobile sources, illustrates the trouble and lack of practical success the art has had and continues to have.

The art is awaiting the development of a process and apparatus that would permit the use of urea or other reagent in an SCR process simply, reliably, economically and safely.

DISCLOSURE OF INVENTION

It is an object of the invention to provide a safe, reliable SCR system for reducing $NO_x$ emissions from an internal combustion engine.

It is another object of the invention to eliminate the safety problems associated with the storage and handling of ammonia.

It is another object of the invention to eliminate wetting or fouling of SCR units while permitting the use of urea.

It is another object of the invention to eliminate the problem of line and injector plugging associated with aqueous urea for mobile applications.

It is another object of the invention to provide a simple, robust, SCR system capable of rapid response for effectively and reliably reducing $NO_x$ emissions from internal combustion engines, especially in mobile applications.

It is a yet further and more specific object of the invention to enable gasifiying urea by pyrolysis prior to introduction into an exhaust, thus facilitating close coupling of reagent injection means and the SCR catalyst.

It is yet another specific object of the invention to provide a simple mechanical device for accomplishing the above objects and preferably to enable close coupling of the reagent injection means and the SCR catalyst, thus permitting the placement of urea injection equipment at a greater variety of positions.

These and other objects are achieved by the present invention, which provides an improved process and apparatus for $NO_x$ reduction. The process, in one of its aspects, comprises: spraying an aqueous solution of urea onto heated surfaces within a pyrolysis chamber having openings therein to permit discharge of gases generated by pyrolysis of the urea and vaporization of water; maintaining the solution in contact with said heated surfaces for a time sufficient to evaporate water from the solution and pyrolyze the urea; introducing gaseous products discharged from the pyrolysis chamber into exhaust gases from the lean-burn engine; and contacting the exhaust gases containing the gaseous products discharged from the pyrolysis chamber with an SCR reactor at an exhaust gas temperature effective for selective catalytic reduction.

In one aspect, the apparatus of the invention for reducing the emissions of $NO_x$ from a lean-burn engine having associated therewith an exhaust system having an exhaust passage leading to an SCR reactor effective for selective catalytic $NO_x$ reduction, comprises: a pyrolysis chamber for pyrolizing urea fed as an aqueous solution including heated internal surfaces and having openings therein to permit discharge of gases generated by pyrolysis of urea and vaporization of water; means for passing the gases generated by pyrolysis into the exhaust gases; and means for passing the exhaust gases containing the gases generated by pyrolysis to an SCR reactor,

BRIEF DESCRIPTION OF THE DRAWINGS

The invention will be better understood and its advantages more apparent from the following detailed description, especially when read in light of the accompanying drawings, wherein.

DETAILED DESCRIPTION OF A PREFERRED EMBODIMENT

Figure 1:
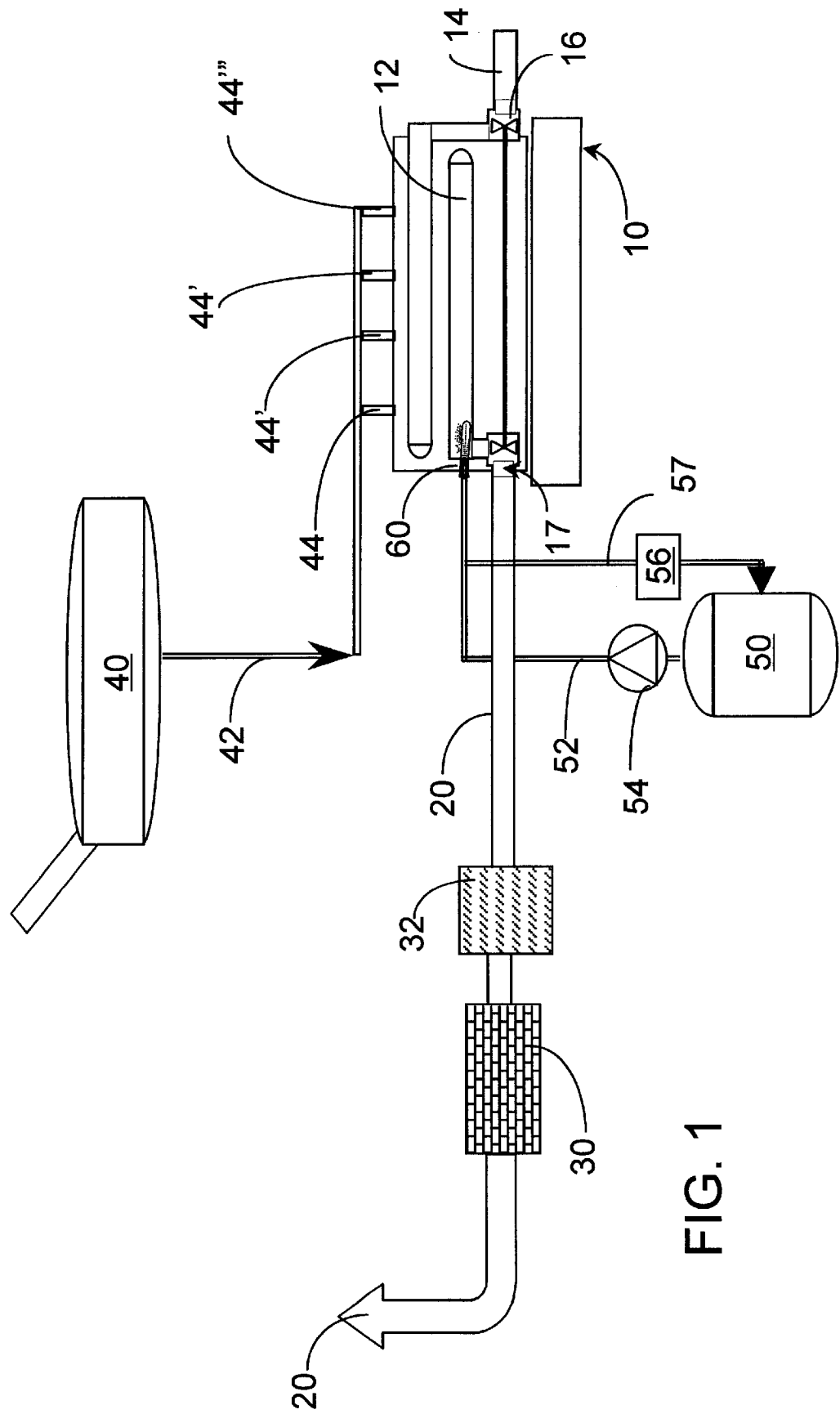
FIG. 1 is a schematic representation of one arrangement of apparatus that can perform the process of the invention.

In this description, the term "lean-burn engine" is meant to include engines that can be operated with an inlet oxygen concentration greater than the amount required for stoichiometric (or chemically correct) combustion of a hydrocarbon fuel, e.g., at least 1% by weight excess oxygen. The term "engine" is meant in the broad sense to include all combustors which combust fuel to provide heat, e.g., for direct or indirect conversion to mechanical or electrical energy. Internal combustion engines of the Otto, Diesel and turbine types, as well as burners and furnaces, are included and can benefit from the invention. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The process is effective with urea, but can utilize other $NO_x$-reducing reagents capable of generating a reactant gas containing ammonia in the exhaust. Aqueous solutions of urea can be employed up to their solubility limits. Typically, the aqueous solution will contain from about 2 to about 65% reagent based on the weight of the solution, A narrower range is from about 25 to about 50%, e.g. about 35%. The invention enables utilizing urea to maximum advantage without the usual concerns of ammonia (also, HNCO and CO) or the concerns of line and nozzle plugging associated with urea hydrolysis or pyrolysis. Concentrated solutions are preferred because they limit the amount of water that must be stored, transported and vaporized.

The urea or other reagent can be stored in any of the above forms or it can be stored dry in a canister. When stored dry, water is passed in contact with the urea as needed to prepare a solution. In this manner the solution concentration can be varied from near saturation (to minimize water storage and use) or to any concentration suitable for a vehicle or stationary installation. It will be desired in many circumstances to provide heaters for the water and/or urea solution storage to prevent freezing or to reduce reaction time in the gasification chamber. Likewise, it may be useful to employ antifreeze materials.

It is another advantage that it is not necessary to employ air or other heat exchange medium in a separate heat exchanger to cool the reagent solution to less than 140° C. These advantages can provide significant savings in energy otherwise necessary to vaporize the water and the savings on the cost of heat exchange media handling equipment. Importantly, the complete gasification of the urea prior to introduction into the exhaust gases facilitates close coupling of the pyrolysis chamber and the SCR catalyst. In this regard, the introduction can be directly adjacent to the SCR reactor, or separated by only sufficient space to include mixing means, if desired.

Reference is made to FIG. 1, which illustrates one embodiment of the invention in schematic form. The invention enables utilization of urea in place of ammonia for SCR $NO_x$ reduction in a manner that avoids wetting or forming solid deposits on the catalyst or forming deposits that can plug the feed system, particularly valves and injectors. And, it does this without the need for the inefficiencies added by the use of either dilute solutions or cooling to prevent fouling or clogging.

FIG. 1 schematically illustrates an embodiment of the invention wherein the exhaust from a diesel engine 10 is treated to reduce $NO_x$. The engine is equipped with an exhaust system having an exhaust passage, such as 20, leading to a catalytic reactor, such as SCR unit 30, effective for selective catalytic $NO_x$ reduction, Urea solution is fed to pyrolysis chamber 100 as a liquid but sprayed as fine droplets of sufficiently small size (e.g., less than $500\mu$) to permit rapid gasification on the heated internal surfaces 101 of the chamber. See FIG. 2 for a better view of one form of chamber. Preferred droplet sizes for urea in the spray 102 are very fine, e.g., less than $100\mu$, with no significant portion (e.g., under 5%) having diameters above $500\mu$ (number average).

The chamber is designed to have sufficient holes or other openings 103 therein to permit gases evolved by pyrolysis to be discharged as shown at 104. The openings can be provided as discrete drilled holes or can be as part of a foraminous wall formed of a suitable material, such as of sintered metal, glass, ceramic, or the like. The spray of the urea solution enables complete gasification in the pyrolysis chamber by direct heat exchange contact with the exhaust gases at temperatures normally encountered in diesel exhaust, e.g., from 300° to 550° C. However, it is sometimes desirable to include auxiliary heating means such as shown in the figure as an electrically-heated jacket. The chamber wall 101 is preferably heated to at least 350° C. to assure complete pyrolysis. Because pyrolysis occurs after evaporation of all water, the use of a catalyst to facilitate this is not necessary, but one can be employed if desired.

It is an advantage of the invention that the provision of the chamber with openings permits the products of urea pyrolysis to be further converted by being held in contact with water vapor sufficiently to convert HNCO to ammonia and carbon dioxide. This is important so that the deposition of solid HNCO is avoided.

The invention enables the gasification of the reagent with no significant residence time in the exhaust gases and permits close-coupling of a reagent injector and an SCR catalyst (e.g., less than 1 meter, and preferably from about 0.05 to about 0.5 meters).

FIG. 1 shows a diesel engine 10 having an exhaust manifold/ passage 12 directing the exhaust from the engine to an exhaust system 20 including a reactor 30 containing a $NO_x$-reducing SCR catalyst before discharge of the combustion gases to the atmosphere. The diesel engine is supplied with fuel from tank 40 via line 42 and fuel injectors 44, 44', 44", and 44'". The fuel tank includes diesel fuel and can be emulsified with water and/or an oxygenated hydrocarbon and/or contain a platinum group metal catalyst composition and/or an auxiliary catalyst composition as will be explained later. Combustion air from line 14 enters turbine 16, and is introduced into the cylinders of the diesel engine and compressed in normal fashion for a diesel engine within each cylinder.

For modern, high-performance diesel engines it is typical to employ a turbine to pressurize the combustion air and to utilize the energy from the exhaust gas to pressurize the combustion air prior to introduction into the cylinders. Turbine 16 is driven by turbine 17 positioned in exhaust line 12. The diesel fuel is injected into the cylinders where it ignites in the presence of the air that has been heated due to compression within the cylinders.

Figure 2:
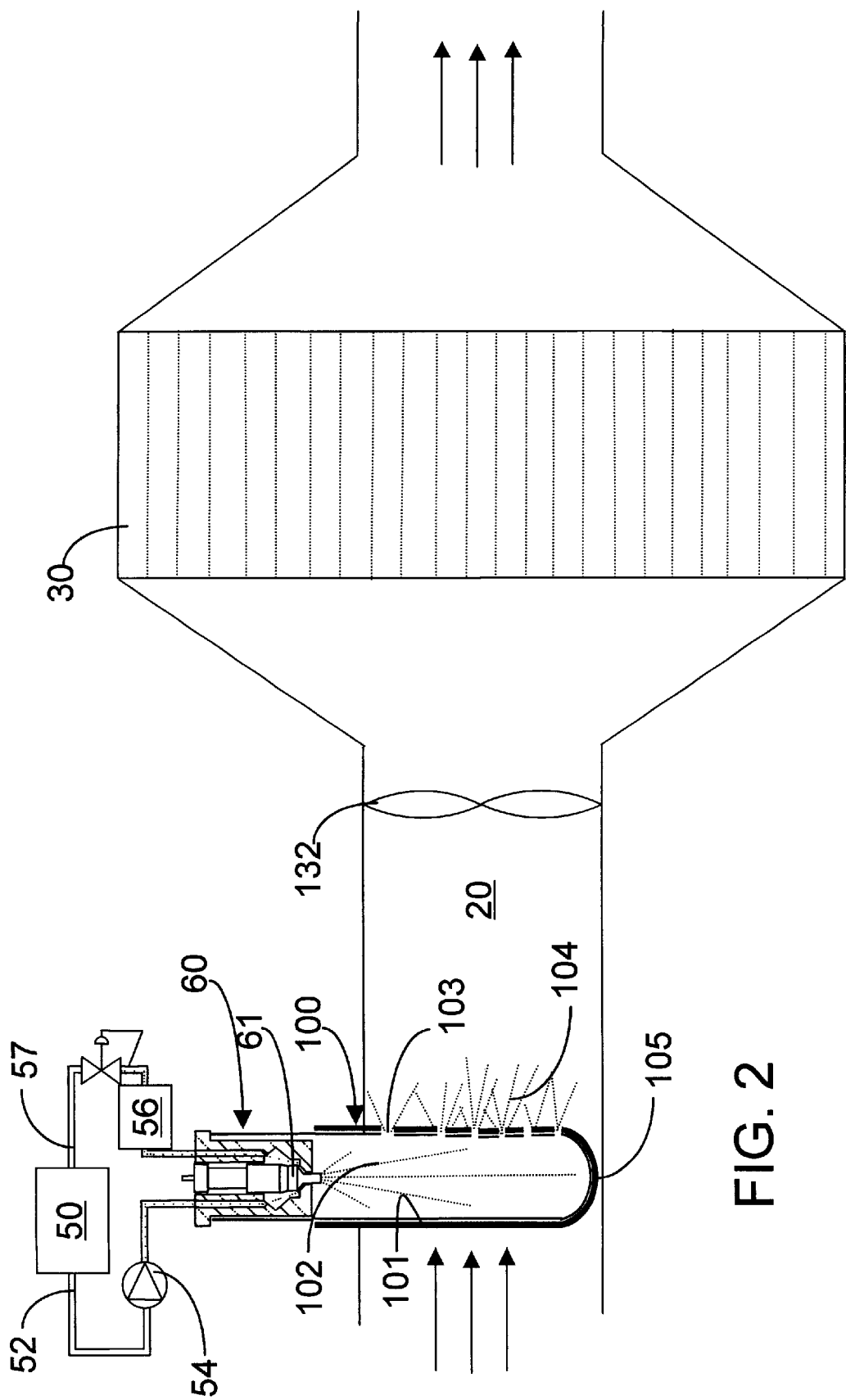
FIG. 2 is an enlarged schematic representation of one form of pyrolysis chamber and associated feed and mixing means.

If desired, the temperature of the reagent solution can be controlled simply as illustrated in the Figures by the provision of a return line 57 from a nozzle 60 employed to form the spray. FIG. 2 shows the nozzle to be of a type with a pintle 61 controlling release of solution into chamber 100. Temperature control to below 140° C. can be achieved by use of optional cooling means, e.g., heat exchanger 56. An effective heat transfer system can be run constantly or on demand as called for by a control signal generated in response to one or more selected conditions of the engine, the exhaust gases or the urea solution. The temperature of the exhaust is one control parameter of importance. The reagent should not be introduced into exhaust when the exhaust temperature is too low for the effective temperature range for the selected catalyst.

The arrangement of FIG. 1 enables reducing the emissions of $NO_x$ from a diesel engine by causing essentially immediate gasification of the reagent upon injection. This facilitates a rapid response time necessary for good control and permits feeding reagent on an as-needed basis. An aqueous urea solution is introduced from tank 50, through line 52 into pyrolysis chamber 100 in exhaust passage 20 by pump 54.

The solution is maintained under pressure at least sufficient to enable spraying and is injected into the hot exhaust gases under at least that pressure. The higher the pressure, the more complete and rapid is the gasification/dispersion of the urea solution upon injection. Typically, the pressure on the solution will be in excess of 35 psig but is not limited to these low pressures and pressures more typical of those employed for fuel injection can be employed, e.g., from 40 to 1000 psi. The temperature is preferably kept below 140° C., and desirably under 100° C. Pressures are limited only by what is practical, e.g., up to about 50,000 psi. It is an advantage of the invention that the high pressures employed to inject the aqueous urea solution can help maintain the lines clear.

Another feature of an embodiment of the invention shows in FIG. 2, which can help maintain the line clear, is a constant circulation of solution from tank 50 to nozzle 60 and then back to the tank via line 57. This embodiment maintains a constant flow of aqueous urea solution to the injector means and recirculating a portion of it to a supply tank. One preferred system is similar in principal components to those employed for injecting fuel into diesel engines, which employ a constant flow of the fluid being injected with a portion always recycled to cool the nozzle to prevent plugging due to excessive hydrolysis prior to spraying.

Another significant feature of one aspect of the invention is the use of injector or spray nozzles that do not require air. In addition to the nozzles of the fuel injector type, there are included other nozzles capable of operation at the pressures involved to achieve ultra-fine sprays. Constant-pressure, solenoid-operated injectors can be operated at rates as high as 50 and even 100 cycles per second and the frequency or the mark space ratio (on-off pulse width ratio) can be varied to control the injection rate. Injectors that lift to begin injection at a particular threshold pressure can be fed by a positive displacement pump or via solenoid actuated valves.

A pump 54 can provide the required pressure for the aqueous solution of reagent in line 52. The pressure will be sufficient, at least, to maintain the reagent solution in the liquid phase for accurate metering, Thus, the pressure must be at least at the minimum to prevent volatilization of either water or hydrolysis products of urea. By maintaining the temperature below about 140° C., there will be no significant problem of hydrolysis.

Figure 3:
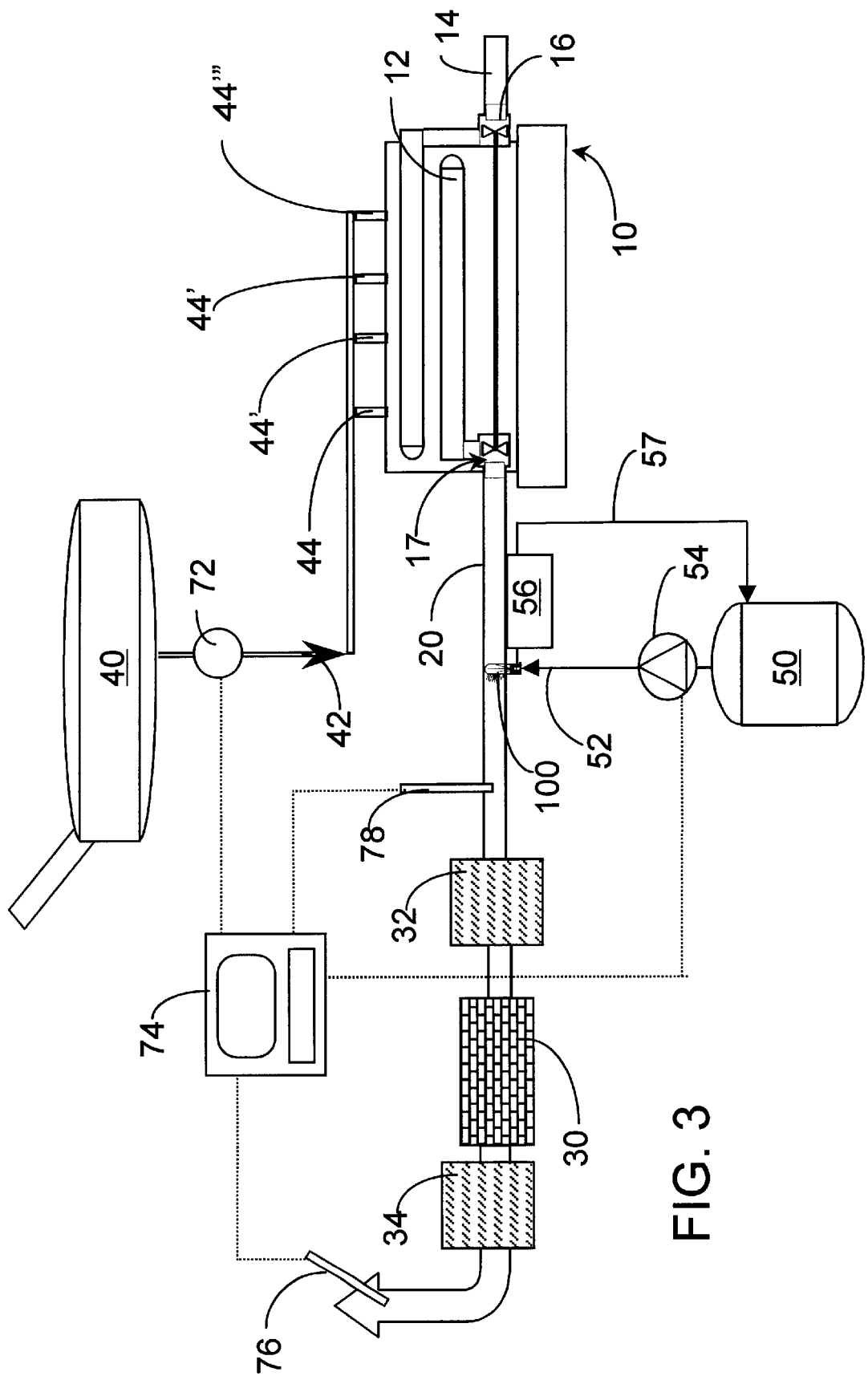
FIG. 3 is a schematic representation of another arrangement of apparatus that can perform the process of the invention.

The arrangement illustrated in FIG. 1 shows injector 60 to be located just upstream of the outlet vanes 17 of a turbocharger. This is one of the preferred orientations, another being centrally within exhaust passage 12 (not shown). FIGS. 2 and 3 show injection following the turbocharger From the supply means including line 52, the reagent is fed to a feed controller which can be a valve or injector 60. The valve or injector employed to feed reactant gases to the exhaust will preferably be maintained at a temperature sufficiently low to assure reliable operation of the valve or other metering or feeding device.

Optionally, a static mixer, such as 32 in FIGS. 1 and 3, and 132 in FIG. 2, (or an uncatalyzed support or a diesel particulate trap) can be positioned between the injector and the $NO_x$-reduction catalyst in chamber 30. It is, however, an advantage of the invention that the thorough gasification of the reagent prior to introduction permits close coupling of the chamber 100 and the catalyst. It is also an advantage of the invention that engine designers can focus on fuel economy and low particulate emissions while relying on the SCR of the invention to control $NO_x$. Optionally, an oxidation catalyst 34 can be provided to strip any residual ammonia or HNCO from the exhaust gases.

The urea or other reagent is introduced into the exhaust gases in an amount sufficient to provide the degree of $NO_x$ reduction desired. The desired amount can be dictated by regulation, engine design requirements or other criteria. Typically, a molar ratio of the active species to the baseline nitrogen oxides level (by which is meant the pretreatment level of $NO_x$ in the effluent) of at least about 0.3:1 will be employed. More narrowly, the reagent is supplied to provide a molar ratio of active species to baseline nitrogen oxides of about 0.5:1 to about 1:1. The reagent levels or target $NO_x$ concentrations in the exhaust can be preprogrammed into the controller based on tested values for given fuel flows and related parameters, or sensors and related controls can be provided to provide real-time readouts. A sensor means might be provided to correct preprogrammed values by feedback control.

FIG. 3 illustrates a control system of a type useful to maintain the proper level of reagent introduction (i.e., dosage). The controller can also time the injections to occur at staggered times in a predetermined sequence designed to smooth out the rate of introduction despite the use of pulsed injectors. It is an advantage of the invention that the introduction of the reagent in discrete charges by injection, facilitates control of dosage in response to feed-forward control, with trim as to feedback parameters if desired.

The aqueous reagent solution can be fed into the exhaust in response to a feed-forward controller in response to a number of measured parameters, including: fuel flow, throttle setting, engine speed, rack setting, intake air temperature, barometric pressure, intake air humidity, exhaust gas temperature and/or other parameters effective for particular engines. In addition, to the extent that sensors are available, trim or feed back control can be provided based on residual gas species following the catalyst, e.g., the level of $NO_x$, HC or CO.

For example, reference to FIG. 3 shows a control system including flow meter 72 which can sense the fuel flow and generate an operation signal representative of fuel flow. Sensors are also shown to determine gas species in the exhaust (76) and the temperature of the exhaust (78) prior to the catalyst 30. The operation signals representative of fuel flow, exhaust gas temperature and residual gas species are received by a controller 74 and compared to stored values. The controller can then generate one or more control signals based on the comparisons. The control signal(s) is then sent to metering pump 54 or other suitable device for metering the correct amount of urea to line 52 or alternatively to injector nozzle controllers. If desired, feedback control can be employed to trim the system in response to residual levels of ammonia, other gas species, or any other measurable engine or exhaust gas property.

The SCR catalyst used is one capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220 to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori et al. in U.S. Pat. No. 4,107,272 discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent containing the reactant gas is most preferably passed over the SCR catalyst while the effluent is at a temperature between about 180° C. and about 650° C., preferably at least 250° C. In this manner, the active species present in the effluent due to pyrolysis and gasification of the reagent solution most effectively facilitates the catalytic reduction of nitrogen oxides. The effluent will preferably contain an excess of oxygen. Use of the present invention with any of the above SCR catalysts (the disclosure of which are specifically incorporated by reference) reduces or eliminates the requirement for the transport, storage and handling of large amounts of ammonia or ammonium water.

Because the invention is compatible with other emission-reducing and fuel economy technologies, a number of hybrid processes become available to the engine designer, vehicle producer and retrofit market. For example, the fuel can be catalyzed with a suitable platinum group metal additive and/or auxiliary catalyst composition selected from the group consisting of compounds of sodium, lithium, potassium, calcium, magnesium, cerium, iron, copper, manganese, and mixtures. Among the compounds are any of those disclosed for example in prior U.S. Pat. Nos. 4,892,562 and 4,891,050 to Bowers and Sprague, 5,034,020 to Epperly and Sprague, 5,215,652 to Epperly, Sprague, Kelso and Bowers, and 5,266,083 to Peter-Hoblyn, Epperly, Kelso and Sprague, WO 90/07561 to Epperly, Sprague, Kelso and Bowers, and U.S. patent application Ser. No. 08/597,517 filed Jan. 31, 1996, now abandoned by Peter-Hoblyn, Valentine and Sprague, hereby incorporated by reference. Where the application permits, a blend of these compounds can be used with one or more other platinum group metal compounds such as soaps, acetyl acetonates, alcoholates, β-diketonates, and sulfonates, e.g., of the type which will be described in more detail below.

The platinum group metal catalyst and/or other catalyst can be added in any manner effective for its intended purpose, such as by adding it to the fuel in bulk storage, to the fuel in a tank associated with the engine, or by continuous or intermittent addition, such as by a suitable metering device, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air, When employed, particularly in combination with particulate traps, platinum group metal catalyst compositions are preferably employed at concentrations of less than 2 parts by weight of platinum group metal per million parts by volume fuel (ppm). For the purposes of this description, all "parts per million" figures are on a weight to volume basis, i.e., grams/million cubic centimeters (which can also be expressed as milligrams/liter), and percentages are given by weight, unless otherwise indicated. Auxiliary catalysts are employed at levels effective for their intended purpose, preferably at levels of from 1 to 100 ppm of the fuel utilized, e.g., 10 to 60 ppm.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

We claim:

1. A method for reducing the emissions of $NO_x$ from a lean-burn engine having associated therewith an exhaust system having an exhaust passage leading to an SCR reactor effective for selective catalytic $NO_x$ reduction, comprising:

feeding an aqueous urea solution from a storage vessel through a line to an injector;

returning urea solution from the injector to the storage vessel, the rates of feed and return being sufficient to supply urea as needed to the exhaust gases for $NO_x$ reduction and maintain the temperature of the urea solution sufficiently low that it is not permitted sufficient time at elevated temperature to hydrolyze the urea to such an extent that solids precipitate;

spraying an aqueous solution of urea from the injector into a pyrolysis chamber having openings therein to permit discharge of gases generated by pyrolysis of the urea and vaporization of water;

maintaining the solution within the pyrolysis chamber for a time sufficient to evaporate water from the solution and pyrolyze the urea;

introducing gaseous products discharged from the pyrolysis chamber into exhaust gases from the lean-burn engine; and contacting the exhaust gases containing the gaseous products discharged from the pyrolysis chamber with an SCR reactor at an exhaust gas temperature effective for selective catalytic reduction.

2. A method according to claim 1 wherein the temperature of the exhaust gases is within the range of from about 180 to about 650° C.

3. A method according to claim 1 wherein the gaseous products of pyrolysis and secondary reactions comprise water vapor, ammonia, isocyanic acid and carbon dioxide.

4. A method according to claim 1 wherein heated surfaces are comprised within the pyrolysis chamber and are heated to a temperature of at least about 300° C.

5. A method according to claim 4 wherein the heated surfaces within the pyrolysis chamber are heated to a temperature of at least about 350° C.

6. A method according to claim 1 wherein the urea solution is maintained under a pressure of at least about 35 psig prior to introduction into the pyrolysis chamber.

7. A method according to claim 1 wherein gaseous products discharged from the pyrolysis chamber are introduced into the exhaust between exhaust valves of the engine and a turbocharger exhaust turbine.

8. A method according to claim 1 wherein the reagent is introduced into the exhaust in close-coupled relation with the SCR catalyst.

9. A method according to claim 1 wherein the pyrolysis chamber is heated by being in heat exchange contact with the exhaust gases.

10. A method according to claim 1 wherein the pyrolysis chamber is heated by auxiliary means.

11. A method for reducing the emissions of $NO_x$ from a lean-burn engine having associated therewith an exhaust system having an exhaust passage for carrying exhaust gases containing $NO_x$ to a reactor effective for selective catalytic $NO_x$ reduction, comprising:

feeding an aqueous urea solution from a storage vessel through a line to an injector;

returning urea solution from the injector to the storage vessel, the rates of feed and return being sufficient to supply urea as needed to the exhaust gases for $NO_x$ reduction and maintain the temperature of the urea solution sufficiently low that it is not permitted sufficient time at elevated temperature to hydrolyze the urea to such an extent that solids precipitate;

spraying the urea solution into a pyrolysis chamber to fully pyrolyze the urea prior to introducing it into the exhaust gases at an exhaust gas temperature sufficient for SCR; and passing the exhaust gas through an SCR reactor.

12. A method according to claim 1 wherein the pyrolysis chamber comprises no catalyst.

13. A method according to claim 1 wherein the pyrolysis chamber comprises a catalyst.

* * * * *